United States Patent [19]

Funakoshi et al.

[11] 4,111,626

[45] Sep. 5, 1978

[54] POWDER COMPACTING MACHINE

[75] Inventors: Yoshiro Funakoshi, Kyoto; Tatsuo Asogawa, Osaka; Eiichi Satake, Suita; Shimesu Motoyama, Asaka; Shuri Yamada, Tokyo; Morio Kakukawa, Tokyo, all of Japan

[73] Assignee: Takeda Chemical Industries, Ltd., Osaka, Japan

[21] Appl. No.: 653,627

[22] Filed: Jan. 29, 1976

[30] Foreign Application Priority Data

| | | | |
|---|---|---|---|
| Feb. 27, 1975 | [JP] | Japan | 50-24816 |
| Apr. 21, 1975 | [JP] | Japan | 50-48892 |
| Jun. 27, 1975 | [JP] | Japan | 50-80341 |

[51] Int. Cl.[2] .......... B29C 15/00

[52] U.S. Cl. .......... 425/203; 425/141; 425/145; 425/208; 425/224; 425/367

[58] Field of Search .......... 425/363, 367, 237, 79, 425/141, DIG. 235, 145, 197, 449, 208, 224

[56] References Cited

U.S. PATENT DOCUMENTS

| | | | |
|---|---|---|---|
| 338,800 | 3/1886 | Stange | 425/367 X |
| 2,868,144 | 1/1959 | Ambrette | 425/205 X |
| 3,269,611 | 8/1966 | Komarek | 425/449 |
| 3,497,321 | 2/1970 | Decker et al. | 425/363 X |
| 3,540,093 | 11/1970 | Boatright, Jr. et al. | 425/197 |
| 3,561,050 | 2/1971 | Danforth | 425/367 X |
| 3,570,054 | 3/1971 | Seanor et al. | 425/367 X |
| 3,734,659 | 5/1973 | Harris | 425/449 |
| 3,860,376 | 1/1975 | Cohlmeyer et al. | 425/367 X |
| 3,890,080 | 6/1975 | Cotts | 425/363 |
| 3,901,635 | 8/1975 | Greenberger | 425/150 X |

*Primary Examiner*—Francis S. Husar
*Assistant Examiner*—John McQuade

[57] ABSTRACT

A powder compacting machine for compressing a mass of powdery material to produce substantially flaky articles of substantially uniform thickness is constituted by a hopper unit having a built-in screw feeder and a pair of opposed compressing rolls. One of the compressing rolls is supported for movement close to and away from the other of the compressing rolls. The hopper unit has a hopper, which may be connected to a source of vacuum, and, on the other hand, one of the compressing rolls has a shape complementary to the other of the compressing rolls so that a substantially uniform thickness of the flaky articles made by compressing a mass of powdery material can be obtained. The machine also has at least one barrier employed to substantially uniformly dispense a mass of powdery material falling towards a clearance between the compressing rolls.

5 Claims, 30 Drawing Figures

POWDER COMPACTING MACHINE

The present invention relates to a powder compacting machine for milling powdery material to produce a molded or compressed product.

More particularly, the present invention relates to an apparatus for compressing powdery material to produce a molded product which can be utilized as a material to be subsequently processed into, for example, granules, which apparatus can advantageously be employed in the manufacture of pharmaceutical granules, granulated foodstuffs, granulated agricultural chemicals, granulated fertilizers, granulated catalysts and the like.

In order to reduce powdery material into granules, two methods have heretofore been employed; one being referred to as a "wet" method wherein liquid medium is employed, and the other being referred to as a "dry" method which is largely used where the powdery material to be processed should not contact any liquid medium because, for example, the powdery material contains one or more substances tending to be decomposed when coming in contact with liquid medium and/or heat.

In the practice of the dry method, a slugging machine has heretofore been utilized to make from powdery material tablets which are subsequently broken into granules. Alternatively, a roller press, substantially composed of a pair of compressing rolls each having a smooth peripheral surface, has also been used.

The employment of the roller press has now been encouraged, so far as the pharmaceutical industry is concerned, since "Rules Of Good Manufacturing Practice" has been established by a group of pharmaceutical firms in Japan, a relevant provision of which stipulates that, when two different pharmaceuticals are to be manufactured by the use of the same machine and equipment, one or more materials forming one pharmaceutical should not mix with one or more materials forming the other pharmaceutical. In view of the fact that the roller press requires a minimum amount of lubricating agent for improvement in productivity and can readily be dismantled for cleaning as compared with the slugging machine, the roller press satisfactorily meets the requirements set forth in the "Rules Of Good Manufacturing Practice".

This does not always means that the conventional roller press and, more particularly, the conventional powder compacting machine is free from problems. Structurally, each of the compressing rolls is so shaped that the outer peripheral surface is smooth and equidistantly spaced from the axis of rotation thereof and powdery material to be compressed is adapted to be fed between these compressing rolls.

With the conventional powder compacting machine of the construction described above, it has been found that a mass of powder being compressed as it is fed through a gap defined between the compressing rolls tends to receive uneven compressive force in a direction widthwise of the pinching rolls, even though the gap is fairly uniform over the entire width of said compressing rolls. The result is that the resultant product, that is, the compressed product or compressed mass of powdery material, has a hardness which varies from one position to another a variation in density per unit area of the compressed mass of powdery material. This is unfavorable particularly where the powdery material is one or a mixture of ingredients forming a granulated pharmaceutical product to be subsequently manufactured from the compressed powdery mass.

More specifically, if pharmaceutical granules are manufactured from the unevenly compressed mass of powdery material, the pharmaceutical granules are most likely to show different stability, dissolubility and/or value according to the amounts of compressive forces which have been applied to the respective portions of the mass of powdery material during the passage of said powdery mass through the gap between the compressing rolls. Therefore, the conventional powder compacting machine involves such disadvantages that it does not give a relatively high yield, that some portion of the resultant compressed powdery mass which has not been sufficiently be compressed needs to be separated from the rest for recycling, and that a substantially uniform quality can not be maintained in the ultimate granular product manufactured from the compressed powder mass produced by such compacting machine.

In order to substantially eliminate the above described disadvantages inherent in the conventional powder compacting machine, various attempts have heretofore been made. One method has been to reduce the width of each of the compressing rolls and another method has been to improve the supply of powdery material to the gap between the compressing rolls. A further method has been to employ a substantially triangular liner positioned on both sides of the gap between the compressing rolls so as to prevent portions of the powdery material, which has been supplied from above the gap into a space defined by substantially adjoining peripheral portions of the pinching rolls and the triangular liners, from leaking laterally of the compressing rolls.

However, these methods have proven unsatisfactory and ineffective, because the fluidity of the powdery material varies depending upon the kind and/or property of such powdery material.

Accordingly, the present invention has for its essential object to provide an improved powder compacting machine capable of yielding uniformly compressed products with respect to different batches of powdery material, with substantial elimination of the above described disadvantages inherent in the conventional powder compacting machine of a similar kind.

According to the present invention, an essential feature resides in the respective shapes of the compressing rolls, as will become clear from the subsequent description.

In any event, these and other objects and features of the present invention will become apparent from the following description taken in conjunction with preferred embodiments thereof with reference to the accompanying drawings, in which.

Figure 27:
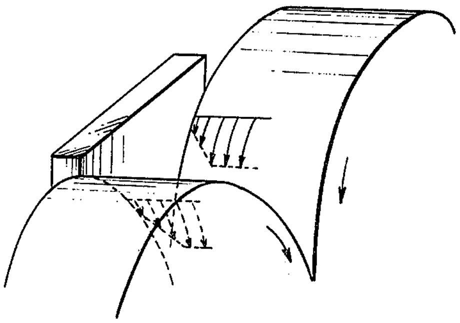
Figure 29:
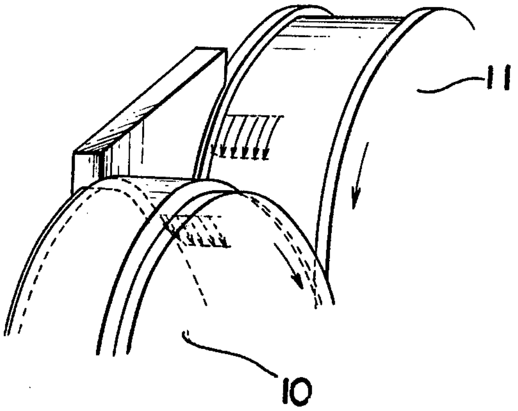
Figure 28:
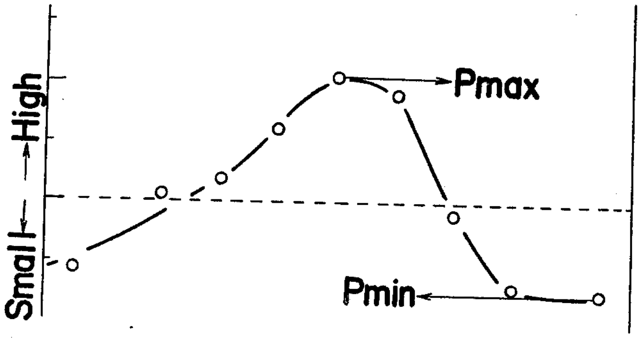
Figure 30:
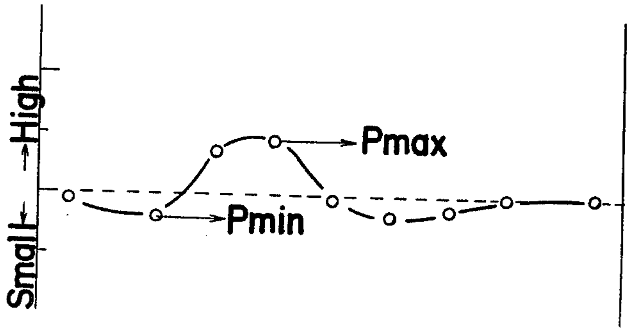

FIGS. 12(A) to 26(A) illustrate various types of barriers, in top plan view, which can be employed in the powder compacting machine according to the present invention;

FIGS. 12(B) to 26(B) are sectional representations of the barriers shown in FIGS. 12(A) to 26(A), respectively;

FIG. 27 is a schematic perspective view of a portion of the conventional powder compacting machine;

FIG. 28 is a schematic diagram showing the pattern of distribution of compressive force in a direction widthwise of one of the compressing rolls of the conventional powder milling machine of FIG. 27;

FIG. 29 is a view similar to FIG. 27, showing a portion of the powder compacting machine according to the present invention; and FIG. 30 is a schematic diagram showing the pattern of distribution of compressive force in a direction widthwise of one of the compressing rolls of the powder compacting machine according to the present invention.

Before the description of the present invention proceeds, it should be noted that like parts are designated by like reference numerals throughout the accompanying drawings.

Figure 1:
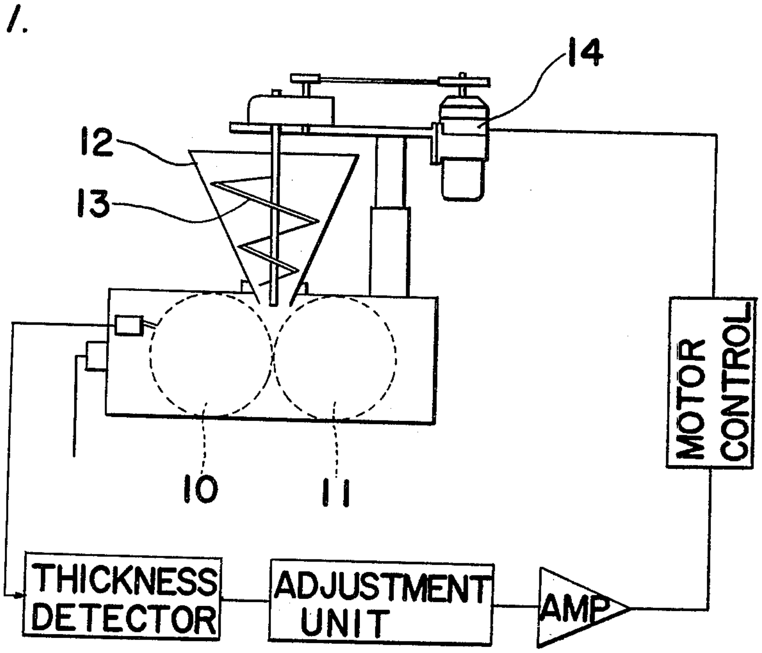
FIG. 1 is a schematic diagram showing a powder milling system including a powder compacting machine according to the present invention.
Figure 2:
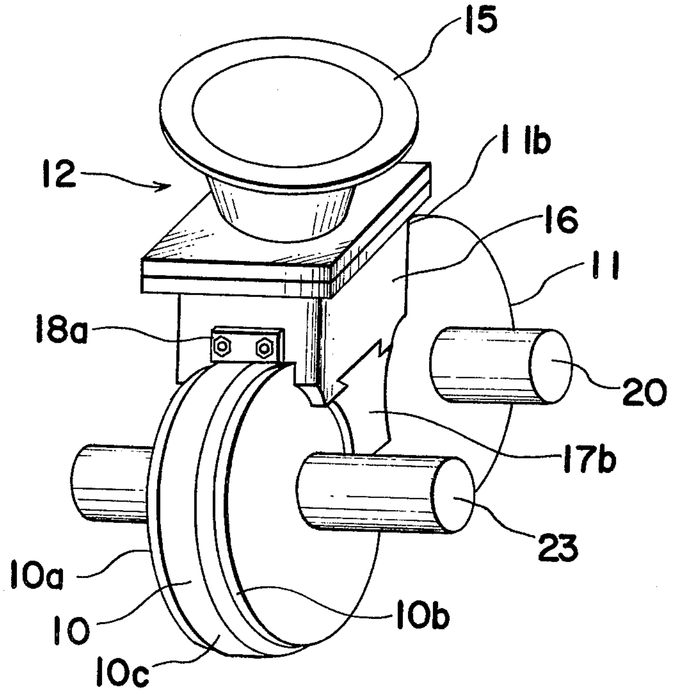
FIG. 2 is a schematic perspective view of the powder compacting machine according to one preferred embodiment of the present invention.
Figure 3:
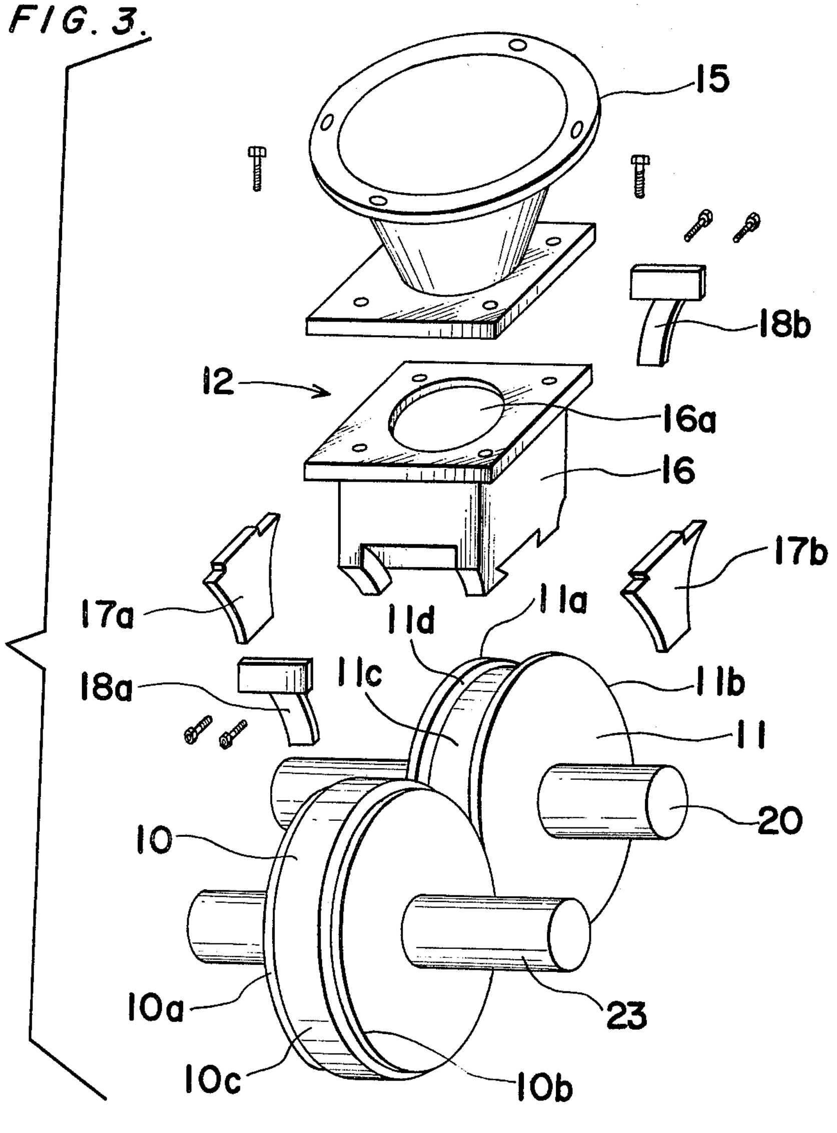
FIG. 3 is an exploded view of the powder compacting machine shown in FIG. 2.
Figure 4:
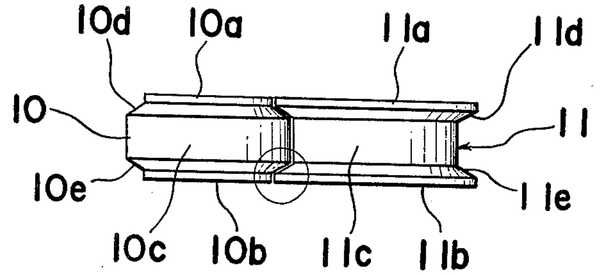
FIG. 4 is a schematic top plan view of a pair of compressing rolls employed in the machine of FIG. 2.

Referring first to FIG. 1, a powder compacting system is illustrated as comprising a powder compacting machine including movable and fixed compressing rolls 10 and 11, both rotatably supported in a manner as will be described later, and a supply unit 12 having a screw feeder 13 driven by a motor 14. The system further comprises a thickness detector for detecting the thickness of a mass of powdery material being compressed between the compressing rolls 10 and 11 and a powder supply control circuitry for adjusting the rate of supply of the powdery material onto said compressing rolls 10 and 11 by controlling the speed of rotation of the motor 14 in accordance with variation in the minimum clearance between the compressing rolls 10 and 11, which minimum clearance corresponds to the size of the gap between said rolls 10 and 11 and is measured in terms of the distance from the point of intersection of the outer periphery of one of the rolls 10 and 11 and an imaginary line passing through the respective axes of rotation of the rolls 10 and 11 to the opposite point of intersection of the outer periphery of the other of the rolls 10 and 11 and the imaginary line.

The thickness detector may be of a type operable to detect variations of the minimum clearance, as defined above, between the compressing rolls 10 and 11, in terms of the amount of pressure imposed on a spring element employed to support a shaft for the movable roll 10. Alternatively, the thickness detector may be composed of a differential transformer for detecting variations of the minimum clearance.

It is to be noted that, in the case where powdery material is to be compressed with the compacting machine of the type to which the present invention pertains, the powdery material to be supplied from the supply unit 12 towards the gap between the compressing rolls 10 and 11 tends to clog up the gap, or otherwise tends to flush through the gap, since the powdery material does not exhibit a uniform physical characteristic such as is the case with a liquid solution. In the case where the powdery material tends to clog up in the gap between the compressing rolls 10 and 11, rotation of the screw feeder 13 is to be accelerated whereas, in the case where the powdery material tends to flush through the gap, rotation of the screw feeder 13 is to be decelerated, so that the thickness of the resultant compressed mass of powdery material can ultimately be maintained uniformly.

In other words, by detecting variations in thickness of a mass of powdery material being compressed between the compressing rolls 10 and 11, the number of revolutions of the screw feeder 13 can be controlled in response to said variations in such a manner that the mass of powdery material being compressed receives a uniform compressive force over the entire width thereof, and a resultant compressed product in the form of substantially flaky articles having uniform thickness can be obtained.

The details of the powder compacting machine shown in FIG. 1 will now be described with particular reference to FIGS. 2 to 7.

Figure 7:
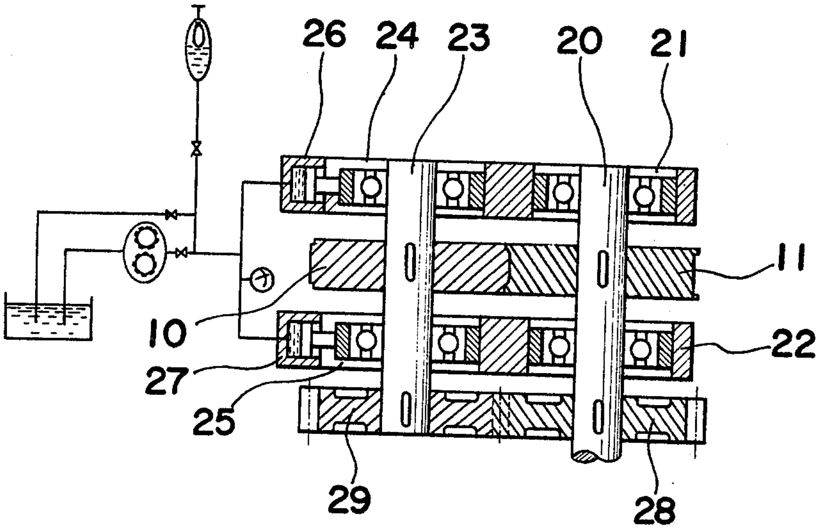
FIG. 7 is a sectional view showing the manner of supporting one of the compressing rolls in relation to the other of the compressing rolls.

As best shown in FIG. 7, the fixed roll 11 is rigidly mounted on a drive shaft 20 having one end rotatably supported on a machine framework (not shown) in a bearing 21 and the other end being coupled to a drive mechanism (not shown), such as an electrically operated motor, through any known reduction gear train (not shown), a substantially intermediate portion of said shaft 20 being also rotatably supported on the machine framework by another bearing 22. On the other hand, the movable roll 10 is rigidly mounted on a driven shaft 23 having opposed ends journalled in respective bearings 24 and 25, said bearings 24 and 25 being supported on the machine framework for movement in such a direction that the movable roll 10 can be moved toward and away from the fixed roll 11. This is possible by applying, for example, a hydraulic pressure simultaneously to said bearings 24 and 25 through associated hydraulic cylinders 26 and 27 by way of a fluid circuit as shown.

Rotation of the drive shaft 20 can be transmitted to the driven shaft 23 by means of a drive gear 28 rigidly mounted on said drive shaft 20 and constantly meshed with a driven gear 29 which is rigidly mounted on the driven shaft 23. It is to be noted that each of the drive and driven gears 28 and 29 must be of a type having a tooth profile of working depth greater than the stroke of movement of the movable roll 10 relative to the fixed roll 11.

Figure 5:
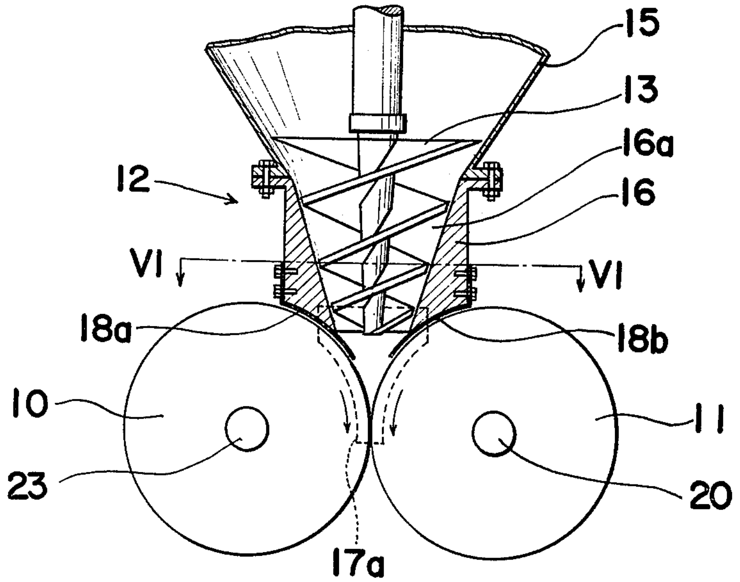
FIG. 5 is a longitudinal sectional view of the machine of FIG. 2.

As best shown in FIG. 5, the supply unit 12 comprises a hopper 15, having the screw feeder 13 therein, and a supply chute 16 flanged to, or otherwise integrally connected with, a lower end of the hopper 15. The hopper 15 and the chute 16 are supported by the machine framework above the clearance between the pinching rolls 10 and 11. The chute 16 has a circular-sectioned passage 16*a* having one end aligned with the hopper 15 and the other end situated immediately above the clearance between said compressing rolls 10 and 11, said passage 16*a* being downwardly tapered towards said other end of said passage 16*a*.

For avoiding any possible leak of powdery material emerging from the lower end of the passage 16*a* in the chute 16, which may otherwise take place in a lateral direction parallel to the widthwise direction of either of the compressing rolls 10 and 11, substantially triangular liners 17*a* and 17*b* are secured to the chute 16 in spaced relation to each other and extend downwardly therefrom towards the lateral sides of the compressing rolls 10 and 11 thereby forming a substantially triangular-sectioned space defined immediately above the clearance between the rolls 10 and 11 and immediately below the lower end of the passage 16*a* in the chute 16.

The chute 16 supports a pair of barriers 18*a* and 18*b* secured thereto in opposed relation to each other in a manner as will now be described. Each of the barriers 18*a* and 18*b* has one end secured to said chute 16 by means of a plurality of set screws and has the other end situated within the substantially triangular-sectioned space above the clearance between the compressing rolls 10 and 11, a substantially intermediate portion thereof being curved to follow the curvature of a corresponding one of the compressing rolls 10 and 11. These barriers 18*a* and 18*b* are shaped as will subsequently be described and serve to uniformly distribute the mass of powdery material which has been fed into the substantially triangular-sectioned space above the clearance in a direction widthwise of the compressing rolls 10 and 11.

The details of each of the compressing rolls 10 and 11 will now be described with particular reference to FIGS. 2 to 4 and 8.

As best shown in FIGS. 2 to 4 and 8, on the outer peripheral surface of the movable roll 10, there is formed a pair of opposed annular shoulders 10*a* and 10*b* and a radially outwardly projecting annular rim 10*c* of substantially trapezoidal section located immediately between said shoulders 10*a* and 10*b*. The shape of the outer periphery of the roll 10, such as described above, must be complementary to that of the fixed roll 11 which will now be described.

On the outer peripheral surface of the fixed roll 11, there is formed a pair of opposed annular flanges 11*a* and 11*b*, each having a cross-sectional shape complementary to the cross-sectional shape of a corresponding one of the annular shoulders 10*a* and 10*b*, and a radially inwardly extending annular recess 11*c* of a cross-sectional shape complementary to the cross-sectional shape of the annular rim 10*c* on the movable roll 10. The depth, as indicated by D in FIG. 8, of the annular recess 11*c*, measured in terms of the distance between the level of the outer surface of the flanges 11*a* and 11*b* and the bottom of said recess 11, is preferably within the range of 0.5 to 10 mm., while the angle of inclination, as indicated by $\theta$ in FIG. 8, of each of annular walls 11*d* and 11*e* each having both sides contiguous to the respective outer surfaces of the annular flanges 11*a* and 11*c* and to the respective sides of the bottom of the annular recess 11*c*, is within the range of 20° to 85°, said angle of inclination $\theta$ being measured between the plane of the walls 11*d* and 11*e* and the bottom of the recess 11*c*. The obtruse angle $\gamma$ between the outer surface of the wall and the bottom of the recess is the supplement of angle $\theta$, i.e. is in the range of 95° to 160°.

A depth D of the annular recess 11*c* within the range of 5 to 8 mm. and an angle of inclination $\theta$ of each of the walls 11*d* and 11*e* within the range of 45° to 75° are more preferred, respectively.

It is to be noted that each of the walls 11*d* and 11*e* on the fixed roll 11 and corresponding walls 10*d* and 10*e*, which extend between the annular rim 10*c* and an associated one of the shoulders 10*a* and 10*b* on the movable roll 10 and which respectively face the walls 11*d* and 11*e*, need not be always straight such as shown, but may be curved either outwardly or inwardly, in which case the angle of inclination $\theta$ referred to above should be understood as meaning the mean value thereof.

Figure 8:
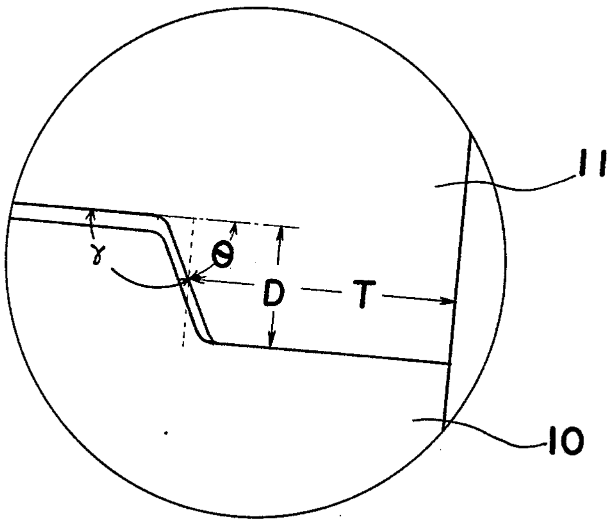
FIG. 8 is a top plan view, on an enlarged scale, of a substantially adjoining portion of the compressing rolls, which portion is indicated by the broken circle in FIG. 4.

Furthermore, the mean thickness, indicated by T in FIG. 8, of each of the annular flanges 11*a* and 11*b* on the fixed roll 11 is to be selected so as to withstand the greatest possible physical force which may be imposed thereon during operation of the powder compacting machine of the present invention and is usually more than about 5 to 10 mm.

The width of the flat bottom of the annular recess 11*c* in the fixed roll 11*c* may be up to twice the diameter of the roll, but need not be limited thereto so long as flaky articles of uniform thickness can be obtained from the mass of powdery material. Furthermore, the outer surface of each of the annular flanges 11*a* and 11*b*, which is shown in parallel relation to the bottom of the annular recess 11*c*, need not be always parallel to said bottom of said annular recess 11*c*.

It is further to be noted that the various adjoining portions between each side of the bottom of the annular recess 11*c* and the corresponding wall 11*d* or 11*e*, between the wall 11*d* and the outer surface of the annular flange 11*a* and between the wall 11*e* and the outer surface of the annular flange 11*b*, all formed in the fixed roll 11, are preferably rounded with a predetermined radius of curvature. Correspondingly, the various adjoining portions between each side of the outer surface of the annular rim 10*c* and the corresponding wall 10*d* or 10*e*, between the wall 10*d* and the shoulder 10*a* and between the wall 10*e* and the shoulder 10*b* are rounded to give them a shape complementary to the respective adjoining portions in the fixed roll 11.

While each of the rolls 10 and 11 is constructed such as hereinbefore fully described, these compressing rolls 10 and 11 are positioned adjacent to each other, in the manner as hereinbefore described with particular reference to FIG. 7, with the annular rim 10*c* in the movable roll 10 received in the annular recess 10*c* on the fixed roll 11.

Where the powder compacting machine employs the movable and fixed rolls 10 and 11 having the construction as hereinbefore described, the barriers 18*a* and 18*b* need not be employed as desired. Moreover, in view of the presence of the annular flanges 11*d* and 11*e* engaged in the shoulders 10*d* and 10*e*, the substantially triangular liners 17*a* and 17*b* may also be omitted if desired.

Referring to the barriers 18*a* and 18*b*, the barriers 18*a* and 18*b* serve to uniformly dispense a continuously supplied mass of powdery material in a direction widthwise of the clearance between the compressing rolls 10 and 11. In the instance as shown in FIGS. 2, 3, 5 and 6, that portion of each barrier 18*a* or 18*b* which contacts the mass of powdery material falling from the lower end of the passage 16*a* in the chute 16 towards the clearance between the compressing rolls 10 and 11 is shown as having a smooth rectangular surface and a substantially rectangular cross-sectional shape, as best shown in FIGS. 12(A) and (B), respectively. Alternatively, that portion of each of the barriers 18*a* and 18*b* may have a shape, as viewed in a direction parallel to the direction of fall of the powdery material towards the clearance between the rolls 10 and 11, and a cross-sectional representation such as shown in FIGS. 13(A) and (B), 14(A) and (B), 15(A) and (B), 16(A) and (B), 17(A) and (B), 18(A) and (B), 19(A) and (B), 20(A) and (B), 21(A) and (B), 22(A) and (B), 23(A) and (B), 24(A) and (B), 25(A) and (B) or 26(A) and (B), respectively.

In any event, each of the barriers 18*a* and 18*b* may have any suitable shape other than such as shown in FIGS. 12 to 26, should it serve the purpose. The most suitable shape may be selected depending upon the type of powdery material to be compressed, the property of the powdery material, the rate of supply of the powdery material and/or the compressive force imparted to the mass of powdery material being compressed as it passes through the clearance between the compressing rolls 10 and 11.

Furthermore, although that portion of each of the barriers 18*a* and 18*b* has been described as curved to follow the curvature of the adjacent roll 10 or 11, it may be curved in a direction substantially diverging from the curvature of the adjacent roll 10 or 11.

That portion of each of the barriers 18*a* and 18*b* has a width not more than the minimum radius of rotation of the lowermost flight of the screw feeder 13, which is indicated by R in FIG. 9 and will be defined later, but need not be limited thereto depending upon the length thereof and/or the type of powdery material to be compressed. By way of example, where the powdery material to be compressed has a good fluidity to an extent that there would be no substantial difference between the amount, per unit area, of powdery material fed through any of the opposed end portions of the clearance between the rolls 10 and 11 and that fed through a portion substantially intermediate between the opposed end portions of the same clearance, that portion of each of the barriers 18*a* and 18*b* may have relatively small width and length so that a relatively small resistance will be imparted to the fall of the powdery material from the passage 16*a* towards the clearance.

More specifically, where each of the barriers 18*a* and 18*b* is of a type wherein the contact surface of that portion of the barrier is outwardly rounded or tapered in cross section, such as shown in FIGS. 13 to 22 and 24, the length and width of that portion of said barrier are preferably within the range of 1/5 to 4/5 of the minimum radius of rotation R and within the range of 1/10 to 2/5 of the minimum radius of rotation R, respectively.

On the contrary thereto, where the powdery material to be compressed has a less fluidity to the extent that the amount, per unit area, of the powdery material fed through that portion substantially intermediate between the opposed end portions of the clearance is greater than that fed through any of the opposed end portions of the same clearance, that portion of each of the barriers 18*a* and 18*b* may have relatively great width and length so that a relatively great resistance will be imparted to the fall of the powdery material from the passage 16*a* towards the clearance between the rolls 10 and 11. In such case, each of the barriers 18*a* and 18*b* to be employed may be of a type wherein the contact surface of that portion of the barrier is smooth such as shown in FIGS. 12, 22, 25 and 26, the length and width of said portion being preferably within the range of ¼ to 5/6 of the minimum radius of rotation R and within the range of 1/5 to 3/5 of the minimum radius of rotation R, respectively.

Each of the barriers 18*a* and 18*b*, irrespective of the shape thereof, may be made of any suitable material, such as wood, metal, synthetic resin, ceramic or fibrous material, so long as it does not adversely affect the powdery material to be compressed, does not easily deteriorate and resists wear. Preferably, stainless steel or steel material usually employed as a material and for cemented carbide machine tools is preferred as a material for the barriers 18*a* and 18*b*.

Figure 6:
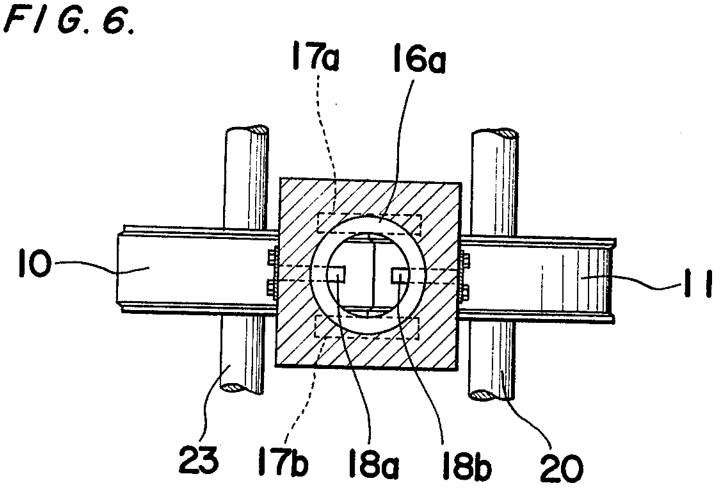
FIG. 6 is a cross sectional view taken along the line VI—Vi in FIG. 5, with the screw feeder removed.
Figure 11:
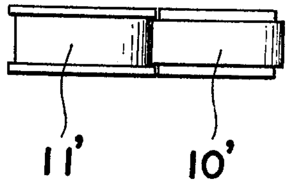
FIG. 11 is a view similar to 4, showing a modified version of the compressing rolls.
Figure 12:
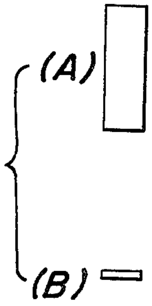
Figure 13:
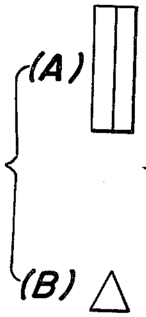
Figure 14:
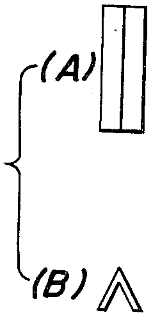
Figure 15:
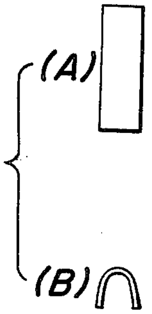
Figure 16:
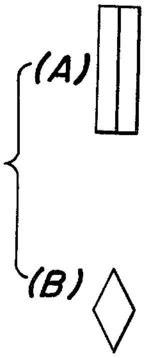
Figure 17:
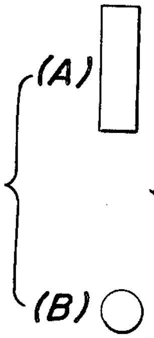
Figure 18:
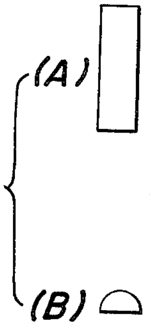
Figure 19:
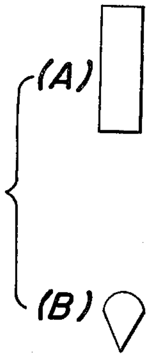
Figure 20:
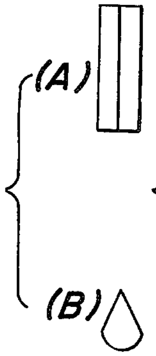
Figure 21:
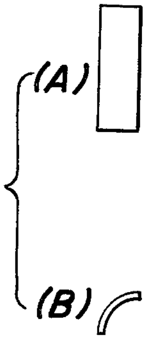
Figure 22:
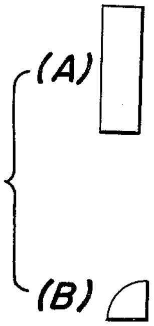
Figure 23:
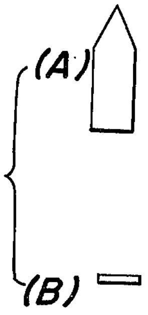
Figure 24:
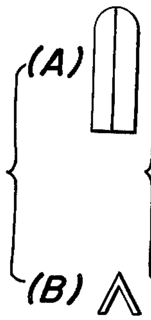
Figure 25:
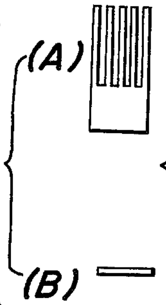
Figure 26:
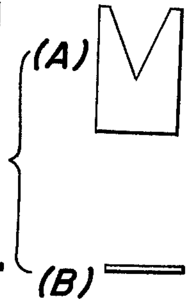

The barriers 18*a* and 18*b* are preferably positioned such that portions thereof extend in a direction towards each other at right angles to the plane, in which the maximum compressive force is applied from the rolls 10 and 11 to the mass of powdery material being compressed, as can readily be seen from FIG. 6. These barriers 18*a* and 18*b* need not be in a substantially symmetrical relation with each other relative to the plane perpendicular to the clearance between the rolls 10 and 11, but one or both of these barriers 18*a* and 18*b* can be displaced in a direction parallel to the widthwise direction of the clearance towards either or both of the liners 17*a* and 17*b* or may be displaced by rotating it or them. Particularly where the powder compacting machine employs the compressing rolls 10 and 11 having the construction shown in FIGS. 2 to 4 and 6 to 7, or modified versions of these compressing rolls 10 and 11 such as shown by 10' and 11' in FIG. 11, the employment of additional barriers each having a shape such as shown in FIGS. 21 or 22 is recommended in addition to the barriers 18*a* and 18*b*, in which case said additional barriers are to be installed adjacent the opposed ends of the clearance and each on both sides of the barrier 18*a* or 18*b*, because the powdery material tends to flow in a greater amount through the opposed end portions of the clearance than through the intermediate portion of the clearance.

Although the barriers 18*a* and 18*b* have been described as rigidly secured to the chute 16 by the use of set screws, they may be rotatably, pushably or drawably mounted for the convenience of adjustment of the position of each of these barriers relative to the adjacent roll and/or replacement.

Furthermore, although two barriers have been described as employed in the compacting machine, it is to be noted that either one of the barriers 18*a* and 18*b* may be omitted depending upon the type of powder compacting machine. The use of a number of barriers more than two may also be possible so long as they do not constitute a cause of clogging of the powdery material within the clearance between the compressing rolls 10 and 11.

An advantage of the employment of the barriers 18*a* and 18*b* in the powder compacting machine will now be described with reference to FIGS. 27, 28 and 30.

Two powder compacting machines, both having a construction similar to that shown in FIGS. 2 to 5 except that the compressing rolls are of such a construction as partially shown in FIG. 27, were tested; one having the barriers 18*a* and 18*b* and the other having no barriers. Each of the compressing rolls of the powder compacting machines tested had a length of 100 mm. and an outer diameter of 400 mm.

The barriers 18*a* and 18*b* employed in one of the powder compacting machines had the construction shown in FIGS. 12(A) and (B), 24 mm. in length, 18 mm. in width and 3 mm. in thickness, and were arranged in a manner similar to that shown in FIGS. 5 and 6. Specifically, each of the barriers 18*a* and 18*b* employed was secured to the chute 16 so as to extend at an angle of 45° relative to the plane of the lower end of the passage 16*a* from the plane passing through the diameter of rotation of the screw feeder 13 at right angles to the plane where the maximum compressive force is applied to the mass of powdery material being compressed between the compressing rolls and had that portion which contacts the mass of powdery material falling from the passage 16*a* towards the clearance between the compressing rolls curved to follow the curvature of the adjacent one of the compressing rolls.

The test results are illustrated in FIGS. 28 and 30, wherein FIG. 28 illustrates the pattern of distribution of compressive force in a direction widthwise of the clearance between the compressing rolls of the powder compacting machine wherein no barriers were employed, while FIG. 30 illustrates the pattern of distribution of compressive force in a direction widthwise of the clearance between the pinching rolls of the powder compacting machine wherein the barriers 18*a* and 18*b* were employed.

Assuming that Pmax represents the highest compressive force applied while Pmin represents the smallest compressive force applied, the ratio Pmax/Pmin was 7.81 in the machine wherein no barriers were employed and 1.85 in the machine wherein the barriers 18*a* and 18*b* were employed according to the teachings of the present invention.

From the comparison of the graphs of FIGS. 28 and 30 and since the ratio is smaller in the machine using the barriers than that in the machine using no barriers, it is clear that the flaky articles of substantially uniform thickness could be manufactured from the powdery material since the barriers satisfactorily functioned to dispense the mass of powdery material uniformly over the width of the clearance between the pinching rolls.

The hopper 15 may be of any known construction. However, powdery material tends to have a low density when the interstices between the particles of the powdery material contain air. In other words, when the interstices between the powdery particles contain air, the apparent specific volume of the powdery material becomes higher than the substantial specific volume when no air is contained in the particle interstices.

Although the conventional hopper unit is satisfactorily operable with a powdery material having an apparent specific volume of not more than 2.5, the capability to supply powdery material tends to be adversely affected when apparent specific volume comes within the range of 4 to 5. The result is that a mass of powdery material can hardly be fed through the clearance between the compressing rolls and, consequently, flaky articles of substantially uniform thickness can not be obtained. Furthermore, when the apparent specific volume of the powdery material to be compressed exceeds 5, the conventional compacting machine will no longer operate satisfactorily.

To avoid the above described inconveniences, the hopper 15 used in the compacting machine according to the present invention is constructed such as hereinafter described with reference to FIGS. 9 and 10.

Figure 9:
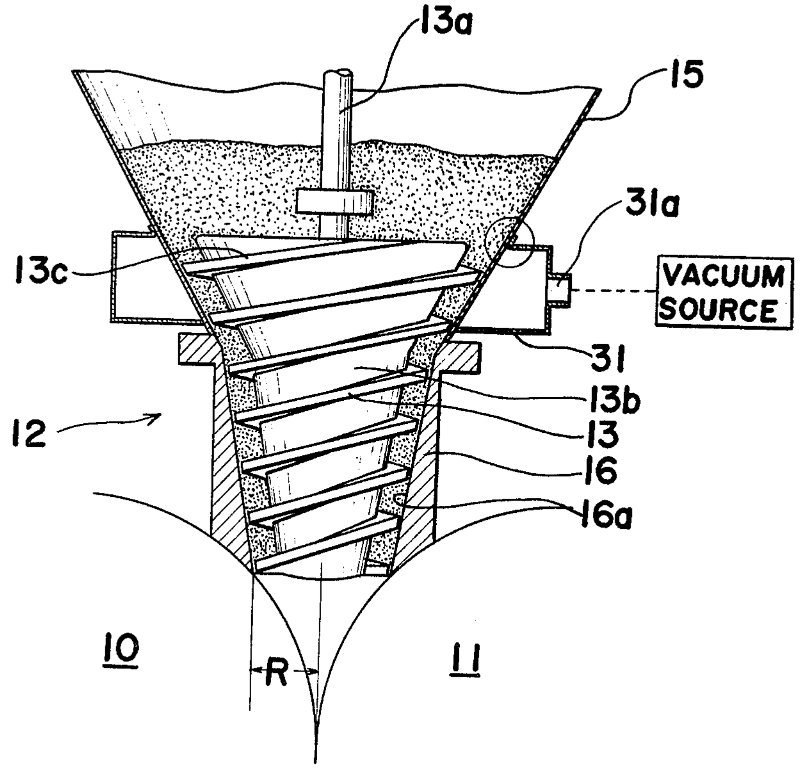
FIG. 9 is a longitudinal sectional view, on an enlarged scale, showing a modified version of a hopper unit employable in the powder compacting machine of the present invention.
Figure 10:
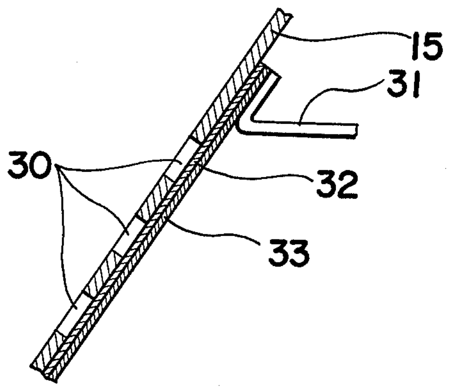
FIG. 10 is a fragmental sectional view of a portion of the hopper unit of FIG. 9 which is indicated by the circle in FIG. 9.

Referring to FIGS. 9 and 10, the hopper 15 is provided with a plurality of perforations 30 arranged in a substantially annular band. The band of perforations 30 are connected to a source of vacuum, for example, a suction blower (not shown) through a substantially annular duct 31 rigidly secured to the external surface of the hopper 15, which duct 31 has at least one suction port 31*a* coupled to the vacuum source by any suitable piping. Secured also to the external surface of the hopper 15 and substantially situated within the duct 31 is a filtering cloth 32 which is in turn backed up by a wire mesh 33. This filtering cloth 32 serves to prevent particles of the powdery material to be compressed from entering the interior of the duct 31 and from being subsequently sucked into the vacuum source.

The position of the band of perforations 30 is selected such as to be at a position substantially adjacent the upper end portion of the screw feeder 13 having a construction as will subsequently be described.

In the construction so far described, since air contained in interstices among particles of the powdery material to be compressed can be exhausted to the outside through the perforations 30, there is no tendency for the powdery particles to be blown by the effect of upwardly expelled under pressure as the mass of powdery material is compressed between the pinching rolls.

The positioning of the band of perforations 30 adjacent the upper end portion of the screw feeder 13 in the manner as hereinbefore described is advisable because it has been found that the powdery material can be positively fed by the screw feeder 13 towards the clearance between the compressing rolls 10 and 11 since a relatively great resistance can be imparted to the mass of powdery material which slidingly falls downwards within the hopper 15 in contact with that portion of the inner surface of the hopper 15 where the perforations 30 are formed.

The hopper 15 has the wall inclined at an angle within the range of 55° to 85° to the horizontal preferably within the range of 60° to 80°. In other words, the wall forming the hopper 15 is downwardly tapered at an angle within the range of 55° to 85°, preferably 60° to 80°.

For further reducing the apparent specific volume of the powdery material to be compressed, that is, for further reducing the density of powdery material contained within the hopper 15, the screw feeder 13 is preferably constructed as hereinafter described.

As shown, the screw feeder 13 comprises a shaft 13*a* having one end coupled to the motor 14, as shown in FIG. 1, through a reduction gear train and the other end in the shape of a substantially inverted cone 13*b* around which a spiral blade 13*c* is formed.

The screw feeder 13 of the above construction is so dimensioned that the ratio of the depth of the convolutions of the spiral blade 13*c*, that is, the difference between the outer diameter of the screw feeder 13 and the diameter of the cone 13*b* to the diameter of the cone 13*b*, is not more than 0.8, and is preferably within the range of 0.2 to 0.6, and the ratio of the depth of the convolutions of the spiral blade 13*c* to the pitch between each two adjacent convolutions of the spiral blade 13*c* is not more than 0.5, and is preferably within the range of 0.2 to 0.4. The depth of the convolutions of the spiral blade 13*c* is preferably within the range of 20 to 60 mm. in the case where the outer diameter of the compressing rolls 10 and 12 employed is not more than 500 mm.

The screw feeder 13 having the above construction is advantageous in that there iis minimized, or substantially eliminated, the possibility of the powdery material clogging in any valley defined between each two adjacent convolutions of the spiral blade 13*c*.

It is to be noted that the filtering cloth 32 is preferably of a type which does not allow particles of powdery material to be processed to pass therethrough, but allows the passage of air contained in the interstices of powdery particles within the hopper 15. In addition, it is to be noted that the suction blower constituting the vacuum source is preferably of a type capable of creating a substantial vacuum of 200 to 1,000 $mmH_2O$.

Advantages of the powder milling machine according to the present invention over the conventional one will now be described in the following examples.

EXAMPLE I

Variations in compressive force generated by the compressing rolls and the amount of powdery material leaked from the lateral sides of the compressing rolls were measured usng the powder compacting machine according to the present invention wherein each of the compressing rolls 10 and 11, made of metal, had an outer diameter of 400 mm. and a length of 100mm and wherein the angle $\theta$ is 65°, the depth D was 6mm., the mean thickness T was 15 mm. and the radius of curvature between each pair of adjoining portions as hereinbefore described was 1.0.

The compacting machine tested was not equipped with the liners 17*a* and 17*b* and the barriers 18*a* and 18*b*.

For the purpose of comparison, a conventional compacting machine employing rolls having the construction shown in FIG. 27 and equipped with the liners 17*a* and 17*b* was also tested in connection with variations in compressive force generated by the compressing rolls and the amount of powdery material leaked from the lateral sides of the compressing rolls.

Variations in the thickness of resultant flaky articles produced during a running time of 20 minutes was also tested depending upon whether or not thickness control was performed. It is to be noted that, when the thickness of the resultant flaky articles being produced was measured, the size of the clearance between the compressing rolls 10 and 11 was controlled by the use of an ordinary differential transformer.

While the test results in connection with the variations in compressive force and the amount of powdery material leaked are illustrated in Table I, the test results in connection with variations in thickness are illustrated in Table II. It is to be noted that, in Table II, Δl represents the difference between the maximum thickness and the minimum thickness of the flaky articles produced during a run of 20 minutes.

Table I

| Experiment No. | Type of Powdery Material | Average Compressive Force ($ton/cm^2$) | Pmax/Pmin | | Amount Leaked | |
|---|---|---|---|---|---|---|
| | | | Conventional | Invention | Conventional | Invention |
| 1 | Lactose | 2.0 | 5.0 | 1.2 | 20% | 3% |
| 2 | Mixture of lactose and corn starch | 2.1 | 5.0 | 1.2 | 25% | 3.5% |
| 3 | Mixture of aspirin aluminum & soft anhydrous silicic acid | 1.8 | 4.0 | 1.2 | 35% | 2% |
| 4 | Mixture of bucetin ethoxybenzamide & hydroxypropyl cellulose | 2.5 | 7.5 | 2.0 | 25% | 3% |
| 5 | Mixture of fish powder & soft anhydrous silicic acid | 3.5 | 5.5 | 1.5 | 40% | 5% |

Table II

| Exp. No. | Type of Powdery Material | Average Thickness (mm) | Value of Δl | |
|---|---|---|---|---|
| | | | Thickness not Controlled | Thickness Controlled |
| 1 | Lactose | 2.5 | 3.0 | 0.5 |
| 2 | Mixture of lactose and corn starch | 1.5 | 1.0 | 0.2 |
| 3 | Mixture of bucetin ethoxybenzamide & amicol C | 1.3 | 1.2 | 0.2 |

From the foregoing Tables I and II, it is clear that the powder compacting machine according to the present invention is superior to the conventional one of a similar kind.

EXAMPLE II

A powder compacting machine having compressing rolls each of which was 400 mm. in diameter and equipped with the hopper unit 12 of the construction shown in FIGS. 9 and 10 was tested. The perforations 30 were 8 mm. in diameter and the filtering cloth, made of cotton and other material, of 750 $cm^2$ was employed. The suction blower was operated so as to create a substantial vacuum of 500 $mmH_2O$. Other particulars of the machine of the invention and those of the conventional machine tested for the purpose of comparision are tabulated in Table III.

Table III

| | Angle of Wall Inclination | $(D_1 - D_2)/D_2$ | $(D_1 - D_2)/P$ | $D_1 - D_2$ |
|---|---|---|---|---|
| Invention | Upper 60° Lower 80° | 0.2 - 0.6 | 0.3 - 0.4 | 44 - 60 mm. |
| Conventional | Upper 60° Lower 80° | 2.6 - 4.4 | 0.7 - 2.4 | 70 - 215 mm. |

It is to be noted that, in Table III, $D_1$ represents the outer diameter of the screw feeder 13, $D_2$ represents the inner diameter of the screw feeder 13 and P represents the pitch between each two adjacent convolutions of the spiral blade of the screw feeder 13.

The ability to supply powdery material from the hopper into the clearance between the compressing rolls 10 and 11 of the machine of the present invention and that of the conventional machine are tabulated in Table IV.

Table IV

| Type of Powdery Material | Invention | Conventional |
|---|---|---|
| Mixture of lactose & White carbon, of apparent specific volume of 6 | 80 kg/hour | 20 kg/hour (Insufficient compression) |
| Mixture of lactose & White Carbon, of apparent specific volume of 4 | 120 kg/hour | 25 kg/hour |

Although the present invention has been fully described by way of example, it should be noted that various changes and modifications will be apparent to those skilled in the art. For example, although in the foregoing description the rolls 10 and 11 have respectively been described as movably and fixedly supported, the functions may be reversed. In other words, the roll 10 may be fixedly supported while the roll 11 may be movably supported. Furthermore, the concept of the present invention can equally be applicable to a roll having a substantially corrugated peripheral surface.

Therefore, unless such changes and modifications depart from the true scope of the present invention, they should be understood as being included therein.

We claim:

1. A powder compacting machine for manufacturing a compressed product fom powdery material which comprises:

first and second compressing rolls, one of said first and second compressing rolls being supported in position for movement of the periphery thereof toward and away from the periphery of the other of said first and second compressing rolls, one of said first and second compressing rolls having an outer peripheral surface having a complementary shape to that of the other of said first and second compressing rolls such that a mass of the powdery material passing through the gap defined between said first and second compressing rolls will receive a substantially uniform compressive force necessary to compress said powdery material, the outer peripheral surface of one of said first and second compressing rolls has a radially inwardly extending annular recess intermediate the width of said one of said first and second compressing rolls having a depth of from 0.5 to 10mm, said recess being defined by a pair of opposed side walls each being inclined at a predetermined obtuse angle of from 95° to 160° to the bottom of said recess, the other of said first and second compressing rolls having a radially outwardly extending rim on the outer peripheral surface thereof having a shape complementary to the shape of said annular recess, the surfaces defining said annular recess and the outer surfaces of said rim cooperating with each other to define said gap, and the material of the rolls at least at said outer peripheral surfaces of said rolls being incompressible under the forces generated on the powder material being compacted;

means coupled to said first and second compressing rolls for driving said first and second compressing rolls in opposite directions to each other so that the mass of the powdery material falling downwardly will be fed further downwardly through the gap between said first and second compressing rolls;

a hopper assembly above said rolls and having a built-in scew feeder for accommodating said powdery material and for positively feeding the mass of the powdery material in a downward direction towards the gap between siad first and second compressing rolls;

means between said hopper assembly and said rolls for substantially uniformly dispensing the mass of powdery material falling from said hopper assembly towards said gap between said first and second compressing rolls over the width of said gap.

2. A powder compacting machine as claimed in claim 1, wherein the compressing roll having the annular recess in the outer peripheral surface is the movably supported compressing roll.

3. A powder compacting machine as claimed in claim 1, wherein the compressing roll having the annular rim on the outer peripheral surface is the movably supported compression roll.

4. A powder compacting machine for manufacturing a compressed product from powdery material which comprises:

first and second compressing rolls, one of said first and second compressing rolls being supported in position for movement of the periphery thereof toward and away from the periphery of the other of said first and second compressing rolls, one of said first and second compressing rolls having an outer peripheral surface having a complementary shape to that of the other of said first and second compressing rolls such that a mass of the powdery material passing through the gap defined between said first and second compressing rolls will receive a substantially uniform compressive force necessary to compress said powdery material, the outer periheral surface of one of said first and second compressing rolls has a radially inwardly extending annular recess intermediate the width of said one of said first and second compressing rolls having a depth of from 0.5 to 10mm, said recess being defined by a pair of opposed side walls each being inclined at a pre-determined obtuse angle of from 95° to 160° to the bottom of said recess, the other of said first and second compressing rolls having a radially outwardly extending rim on the outer peripheral surface thereof having a shape complementary to the shape of said annular recess, the surfaces defining said annular recess and the outer surfaces of said rim cooperating with each other to define said gap, and the material of the rolls at least at said outer peripheral surfaces of said rolls being incompressible under the forces generated on the powder material being compacted;

means coupled to said first and second compressing rolls for driving said first and second comrpessing rolls in opposite directions to each other so that the mass of the powdery material falling downwardly will be fed furhter downwardly through the gap between said first and second compressing rolls;

a hopper assembly above said rolls and having a built-in screw feeder for accommodating said powdery material and for positively feeding the mass of the powdery material in a downward direction towards the gap between said first and second compressing rolls.

5. A powder compacting machine as claimed in claim 4 in which said hopper assembly has a hopper with a substantially inverted truncated conical shape with a wall inclination within the range of 55 to 85° to the horizontal, said hopper having a plurality of perforations therein, and a source of vacuum coupled to said perforations, the ratio of the difference between the outer diameter of said screw feeder and said inner diameter of said screw feeder relative to the inner diameter of the screw feeder being not more than 0.8 and the ratio of the difference between said outer diameter of said screw feeder and said inner diameter of said screw feeder relative to the pitch between each adjacent two turns of the screw blade of said screw feeder being not more than 0.5.

* * * * *

UNITED STATES PATENT AND TRADEMARK OFFICE

CERTIFICATE OF CORRECTION

PATENT NO. : 4,111,626

DATED : September 5, 1978

INVENTOR(S) : YOSHIRO FUNAKOSHI, TATSUO ASOGAWA, EIICHI SATAKE, SHIMESU MOTOYAMA, SHURI YAMADA and MORIO KAKUKAWA It is certified that error appears in the above-identified patent and that said Letters Patent are hereby corrected as shown below:

In the heading, line 73, after "Takeda Chemical Industries, Ltd., Osaka, Japan" insert --and Freund Industrial Co., Ltd., Tokyo, Japan--.

Signed and Sealed this

*Fifteenth* Day of *May 1979*

[SEAL]

*Attest:*

DONALD W. BANNER
*Commissioner of Patents and Trademarks*

RUTH C. MASON
*Attesting Officer*